US007356925B2

(12) United States Patent
Bubeck

(10) Patent No.: US 7,356,925 B2
(45) Date of Patent: Apr. 15, 2008

(54) METHOD FOR PRODUCING A COOLED RING CARRIER

(75) Inventor: Eberhard Bubeck, Fellbach (DE)

(73) Assignee: MAHLE GmbH, Stuttgart (DE)

( * ) Notice: Subject to any disclaimer, the term of this patent is extended or adjusted under 35 U.S.C. 154(b) by 602 days.

(21) Appl. No.: 10/519,271

(22) PCT Filed: Jun. 18, 2003

(86) PCT No.: PCT/DE03/02047

§ 371 (c)(1),
(2), (4) Date: Dec. 27, 2004

(87) PCT Pub. No.: WO04/000489

PCT Pub. Date: Dec. 31, 2003

(65) Prior Publication Data

US 2006/0151573 A1 Jul. 13, 2006

(30) Foreign Application Priority Data

Jun. 25, 2002 (DE) ................................ 102 28 256
Jun. 7, 2003 (DE) ................................ 103 25 916

(51) Int. Cl.
*B23P 15/06* (2006.01)

(52) U.S. Cl. .................................... 29/888.074; 92/227

(58) Field of Classification Search .................. 123/41, 123/41.35, 193.2, 193.4, 193.6; 92/165 R, 92/166, 227, 228, 176, 186; 29/888.047, 29/888.049, 888.07, 888.072, 888.074; 164/132, 164/75

See application file for complete search history.

(56) References Cited

U.S. PATENT DOCUMENTS

| | | | | |
|---|---|---|---|---|
| 3,963,818 | A * | 6/1976 | Sakoda et al. | 264/109 |
| 4,120,081 | A * | 10/1978 | Rosch et al. | 29/888.045 |
| 4,907,545 | A * | 3/1990 | Mills | 123/41.35 |
| 6,475,804 | B1 * | 11/2002 | Lohse | 436/506 |

FOREIGN PATENT DOCUMENTS

| | | | |
|---|---|---|---|
| DE | 26 24 412 | A | 12/1977 |
| DE | 143 563 | A | 9/1980 |
| DE | 197 01 085 | A | 7/1998 |
| DE | 101 34 293 | A | 3/2003 |
| FR | 2 044 242 | A | 2/1971 |
| GB | 1 229 346 | A | 4/1971 |

* cited by examiner

*Primary Examiner*—David P. Bryant
*Assistant Examiner*—Alexander P Taousakis
(74) *Attorney, Agent, or Firm*—Collard & Roe, P.C.

(57) ABSTRACT

The invention relates to a method for producing a cooled ring carrier (1) for an aluminium piston pertaining to an internal combustion engine and produced according to a casting method, comprising a cooling channel (6) which is embodied on the rear (3) of the ring carrier as a downwardly open turned groove (4) According to the invention, salt granules are pressed into the turned groove (4) at a pressure of between 100 and 300 N/mm$^2$, in such a way that a salt core (5) is formed in the turned groove (4) The composite consisting of the ring carrier and the salt core is then immersed in an alfin bath.

3 Claims, 1 Drawing Sheet

METHOD FOR PRODUCING A COOLED RING CARRIER

CROSS REFERENCE TO RELATED APPLICATIONS

Figure 1:
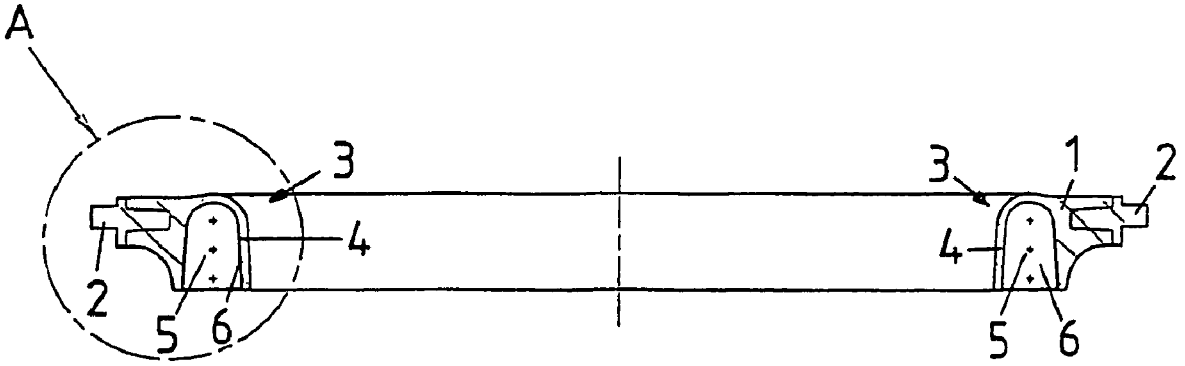

Applicants claim priority under 35 U.S.C. §119 of German Application Nos. 102 28 256.0 and 103 25 916.3 filed Jun. 25, 2002 and Jun. 7, 2003, respectively. Applicants also claim priority under 35 U.S.C. §365 of PCT/DE2003/002047 filed Jun. 18, 2003. The international application under PCT article 21(2) was not published in English.

The invention relates to a method for the production of a cooled ring insert consisting of a gray casting alloy having a nickel content, for an aluminum piston of an internal combustion engine. This is produced by using the casting method, having a cooling channel formed on the ring insert back, as a turned groove that is open towards the bottom.

From the state of the art, it is generally known, in the case of a cooling channel piston to be produced using the casting method, to pre-form the cooling channel provided in this connection as a pressed salt core, and to attach it in the casting mold by way of sleeves, before the melt is filled into the casting mold. In order to arrange this cooling channel in such a manner that a thermally particularly stressed ring insert is thereby preferably cooled, a ring insert for the piston of an internal combustion engine is proposed, in the French patent 2.044.242, that has a recess open towards the bottom, on the inside. This recess is first filled with a material that can be dissolved out well, before the ring insert, without having first been dipped in an alfin bath, is laid into the casting mold for a piston, after which the piston is produced by means of filling liquid metal into the casting mold. Because of the fact that in this case, bonding of the ring insert does not occur, there is no sufficiently strong bond between the ring insert and the cast piston produced by this known method, so that in the use of the piston known from the state of the art, function problems must be expected in an internal combustion engine.

Subsequent to this, the material is dissolved by means of a suitable liquid, and removed from the recess of the ring insert, so that a cooling channel results in the piston, as this happens. There is no information that can be derived from the state of the art as to the type of material that is filled into the recess, and the liquid that can dissolve this material. Furthermore, the method for the production of a cooling piston, according to the state of the art, has the disadvantage that if the recess is simply filled, cavities can form between the walls of the recess and the material being used for this purpose, which cavities are filled by the metal melt during subsequent casting of the cooling channel piston, thereby reducing the cross-section of the cooling channel that is formed.

Proceeding from this, the invention is based on the problem of improving the known method for the production of a ring insert having a cooling channel piston, in such a manner that it is easy to carry out, and that it avoids the disadvantages of the state of the art.

This problem is solved with the following method for the production of a cooling ring insert: (1) salt granulate is pressed into the turned groove at a pressure of 100 to 300 $N/mm^2$, so that a salt core is formed in the turned groove; (2) the combination consisting of the ring insert and the salt core is pre-heated to a temperature of 200° C. to 250° C.; and (3) the combination consisting of the ring insert and the salt core is dipped into an alfin bath consisting of an aluminum melt.

Because the turned groove worked into the back of the ring insert serves as a form into which the salt granulate for forming a salt core is pressed, the salt core takes on the precise shape of the turned groove, so that no cavities of any kind can form between the salt core and the turned groove.

In accordance with a further embodiment of the invention, a finished, pressed salt core is laid into the turned groove, which core is attached in the holder by way of an adhesive bond. The method for the production of a ring insert having a cooling channel is greatly simplified thereby, and therefore also made less expensive.

Figure 2:
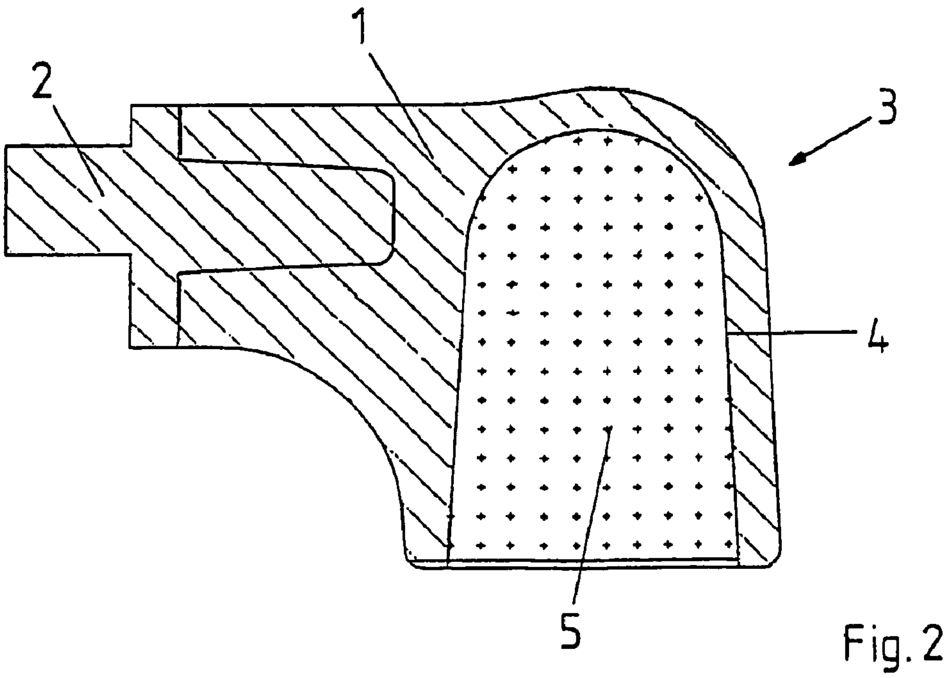

The method according to the invention will be explained in greater detail using several drawings. These show:

FIG. 1 a cross-section through a ring insert having a turned groove for accommodating a salt core, and FIG. 2 an enlarged view of a region of the ring insert, indicated with A in FIG. 1.

A ring insert 1 for a piston ring 2 to be disposed on its outside, shown in cross-section in FIG. 1, has a turned groove 4 on its ring insert back 3, in the form of a recess open towards the bottom. The ring insert 1 is produced in known manner, from an alloy consisting of a gray casting containing 18% nickel.

Within the framework of the production method of a piston equipped with the ring insert 1, the ring insert 1 is placed into a casting mold that is filled with aluminum, for example. In order to achieve the result, in this connection, that the turned groove 4 is not filled with aluminum, but rather is available as a cooling channel 6 in the finished piston, salt granulate is pressed into the turned groove 4 at a pressure of 100 to 300 $N/mm^2$, in a first step of the method according to the invention, so that a salt core 5 is formed from the salt granulate. As a result of the volume loss of the salt granulate, projecting ridges can form on the wall of the cooling channel 6, in this connection, and these can be lathed away, if necessary.

As an alternative to this, a finished, pressed salt core 5 can also be placed into the turned groove 4. The hold of the salt core in the turned groove 4 can then be assured by means of an adhesive bond.

In a second method step, the combination consisting of the ring insert 1 and the salt core 5 is pre-heated to a temperature of 200° C. to 250° C., before the ring insert/salt core combination is dipped into an alfin bath for 2½ to 5½ minutes, in a third method step, which bath consists of a hot aluminum melt at a temperature of approximately 730° C. The purpose of this is for the aluminum used in the process to form a good bond with the gray casting alloy of which the ring insert 1 consists, during the subsequent method step for the production of an aluminum piston, after the ring insert 1 has been placed into a casting mold and the piston has been cast.

Subsequent to the casting process for the production of the aluminum piston, an inflow and an outflow are still drilled in the cooling channel 6, which is still filled with the salt core 5, thereby making it possible for the salt core 5 to be dissolved out of the cooling channel 6, using water.

FIG. 2 shows an enlarged view of a region indicated in FIG. 1 as A, in which the ring insert 1 with the piston ring 2, the turned groove 4 made in its back 3, and the salt core 5 pressed into the groove can be clearly seen.

REFERENCE SYMBOL LIST

A region
1 ring insert
2 piston ring

3 ring insert back
4 turned groove
5 salt core
6 cooling channel

The invention claimed is:

1. Method for the production of a cooled ring insert, consisting of a gray casting alloy having a nickel content, for an aluminum piston of an internal combustion engine, to be produced using the casting method, having a cooling channel formed on the ring insert back, as a turned groove that is open towards the bottom, comprising the following steps:

salt granulate is pressed into the turned groove at a pressure of 100 to 300 N/mm$^2$, so that a salt core is formed in the turned groove;

the combination consisting of the ring insert and the salt core is pre-heated to a temperature of 200° C. to 250° C.; and the combination consisting of the ring insert and the salt core is dipped into an alfin bath consisting of an aluminum melt.

2. Method for the production of a cooled ring insert as recited in claim 1, wherein the combination consisting of the ring insert and the salt core combination is dipped into an alfin bath consisting of an aluminum melt for 2½ to 5½ minutes.

3. Method for the production of a cooled ring insert, consisting of a gray casting alloy having a nickel content, for an aluminum piston of an internal combustion engine, to be produced using the casting method, having a cooling channel formed on the ring insert back, as a turned groove that is open towards the bottom, comprising the following steps:

a finished, pressed salt core is placed into the turned groove, and attached in the turned groove by means of an adhesive bond;

the combination consisting of the ring insert and the salt core is pre-heated to a temperature of 200° C. to 250° C.; and the combination consisting of the ring insert and the salt core is dipped into an alfin bath consisting of an aluminum melt.

* * * * *